US012630784B2

(12) United States Patent
Ghosh et al.

(10) Patent No.: US 12,630,784 B2
(45) **Date of Patent: *May 19, 2026**

(54) FORMULA DESIGN FOR A SOLID LAUNDRY FABRIC SOFTENER

(71) Applicant: ECOLAB USA INC., Saint Paul, MN (US)

(72) Inventors: Kaustav Ghosh, Saint Paul, MN (US); Emily Chen, Saint Paul, MN (US); Jessica Bull, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/480,697

(22) Filed: Oct. 4, 2023

(65) Prior Publication Data

US 2024/0060009 A1 Feb. 22, 2024

Related U.S. Application Data

(60) Continuation of application No. 17/302,169, filed on Apr. 26, 2021, now Pat. No. 11,814,606, which is a division of application No. 16/456,249, filed on Jun. 28, 2019, now Pat. No. 11,015,144.

(60) Provisional application No. 62/691,773, filed on Jun. 29, 2018.

(51) Int. Cl.

| | |
|---|---|
| ***C11D 3/00*** | (2006.01) |
| ***C11D 3/20*** | (2006.01) |
| ***C11D 3/30*** | (2006.01) |
| ***C11D 3/37*** | (2006.01) |
| ***C11D 17/00*** | (2006.01) |

(52) U.S. Cl.

CPC ............ *C11D 3/001* (2013.01); *C11D 3/2082* (2013.01); *C11D 3/30* (2013.01); *C11D 3/3707* (2013.01); *C11D 3/3742* (2013.01); *C11D 17/0047* (2013.01); *C11D 2111/12* (2024.01)

(58) Field of Classification Search

CPC ......... C11D 3/001; C11D 3/2082; C11D 3/30; C11D 3/3707; C11D 3/3742; C11D 17/0047; C11D 2111/12; C11D 1/62; C11D 3/2079; C11D 3/2086; C11D 3/373

See application file for complete search history.

(56) References Cited

U.S. PATENT DOCUMENTS

| | | | | |
|---|---|---|---|---|
| 4,320,147 | A | 3/1982 | Schaeufele | |
| 4,769,159 | A | 9/1988 | Copeland | |
| 5,300,238 | A | 4/1994 | Lin et al. | |
| 5,389,685 | A | 2/1995 | Smith et al. | |
| 5,407,589 | A | 4/1995 | Turner | |
| 5,545,749 | A | 8/1996 | Smith et al. | |
| 5,547,990 | A | 8/1996 | Hall et al. | |
| 5,833,741 | A | 11/1998 | Walker | |
| 6,376,455 | B1 | 4/2002 | Friedli et al. | |
| 6,464,764 | B1 | 10/2002 | Lichtenberg et al. | |
| 6,583,181 | B1 | 6/2003 | Chiang et al. | |
| 6,787,516 | B2 | 9/2004 | Moorfield et al. | |
| 6,939,840 | B2 | 9/2005 | Lichtenberg et al. | |
| 7,108,725 | B2 * | 9/2006 | Caswell | C11D 3/3742 510/439 |
| 8,221,733 | B2 | 7/2012 | Lichtenberg et al. | |
| 8,673,838 | B2 | 3/2014 | Christensen et al. | |
| 10,113,139 | B2 | 10/2018 | Wetrosky et al. | |
| 10,206,392 | B2 | 2/2019 | Kloeppel et al. | |
| 10,285,400 | B2 | 5/2019 | Lei et al. | |
| 11,015,144 | B2 * | 5/2021 | Ghosh | C11D 3/2086 |
| 11,814,606 | B2 * | 11/2023 | Ghosh | C11D 3/2082 |
| 2003/0029812 | A1 | 2/2003 | Burns et al. | |
| 2003/0114342 | A1 | 6/2003 | Hall | |
| 2003/0187073 | A1 | 10/2003 | Lichtenberg et al. | |
| 2004/0220275 | A1 | 11/2004 | Lutzeler et al. | |
| 2005/0124723 | A1 | 6/2005 | Fritschi et al. | |

(Continued)

FOREIGN PATENT DOCUMENTS

| | | | |
|---|---|---|---|
| JP | 63254199 | A | 10/1988 |
| JP | 4263669 | A | 9/1992 |

(Continued)

OTHER PUBLICATIONS

Chupa et al., "Soap, Fatty Acids, and Synthetic Detergents", Handbook of Industrial Chemistry and Biotechnology, pp. 1431-1471, online at https://doi.org/10.1007/978-1-4614-4259-2_36 Nov. 19, 2012.

Kent, J.A., "Soap, Fatty Acids, and Synthetic Detergents", Reigel's Handbook of Industrial Chemistry, pp. 1098-1140, online at https://doi.org/10.1007/0-387-23816-6_27 Aug. 26, 2003.

Ecolab USA Inc., PCT/US2019/039713 filed Jun. 28, 2019, "The International Search Report and the Written Opinion of the International Searching Authority, or the Declaration", 17 pages, mailed Sep. 16, 2019.

Office Action in EP19740273.8, mailed Mar. 2, 2026, 10 pages.

(Continued)

*Primary Examiner* — Angela C Brown-Pettigrew
*Assistant Examiner* — Preeti Kumar
(74) *Attorney, Agent, or Firm* — McKee, Voorhees & Sease, PLC

(57) ABSTRACT

Solid laundry fabric softening compositions for laundry applications of use are disclosed. In particular, solid laundry fabric softening compositions combining quaternary dialkyl actives with low iodine values and silicone provide softness without causing any significant yellowing or loss of water absorption or wicking to the treated linen. The solid laundry fabric softening compositions can be provided as a multi-use block having uniform dispensing rates and without block sloughing. Beneficially, the combination of processing aids for solidification comprising one or more of (A) polyethylene glycol and an acidulant, (B) a surfactant and an acidulant, or (C) polyethylene glycol, a surfactant and an acidulant, are combined with the quaternary ammonium compounds and silicone to provide the stable solid composition.

19 Claims, No Drawings

(56) References Cited

U.S. PATENT DOCUMENTS

| | | | | |
|---|---|---|---|---|
| 2005/0197269 | A1 | 9/2005 | Graydon et al. | |
| 2008/0289116 | A1 | 11/2008 | Young et al. | |
| 2012/0030882 | A1 | 2/2012 | Wetrosky et al. | |
| 2012/0324652 | A1* | 12/2012 | Christensen ............. | C11D 1/62 510/515 |
| 2014/0171512 | A1 | 6/2014 | Kloeppel et al. | |
| 2017/0137750 | A1 | 5/2017 | Zhang et al. | |
| 2017/0255725 | A1 | 9/2017 | Frankenbach et al. | |
| 2017/0284605 | A1 | 10/2017 | Janak et al. | |
| 2018/0051235 | A1 | 2/2018 | Schubert et al. | |
| 2018/0230402 | A1 | 8/2018 | Christensen et al. | |
| 2018/0360706 | A1 | 12/2018 | Dihora et al. | |
| 2019/0024018 | A1 | 1/2019 | Panandiker et al. | |
| 2019/0024019 | A1 | 1/2019 | Panandiker et al. | |
| 2020/0229435 | A1 | 7/2020 | Malet et al. | |
| 2020/0305437 | A1 | 10/2020 | McGeechan et al. | |

FOREIGN PATENT DOCUMENTS

| | | | | |
|---|---|---|---|---|
| JP | 101870 | A | 1/1998 | |
| JP | 2006138063 | A | 6/2006 | |
| JP | 2010180485 | A | 8/2010 | |
| WO | 0035283 | A1 | 6/2000 | |
| WO | 0059696 | A2 | 10/2000 | |
| WO | 2006043059 | A1 | 4/2006 | |
| WO | WO-2007095255 | A2 * | 8/2007 | ............. A01N 1/021 |
| WO | 2008049616 | A1 | 5/2008 | |
| WO | 2012176090 | A2 | 12/2012 | |

* cited by examiner

FORMULA DESIGN FOR A SOLID LAUNDRY FABRIC SOFTENER

CROSS REFERENCE TO RELATED APPLICATION

This is a Continuation application of U.S. Ser. No. 17/302,169, filed Apr. 26, 2021. which is a Divisional Application of U.S. Ser. No. 16/456,249, filed Jun. 28, 2019, which claims priority under 35 U.S.C. § 119 to provisional application Ser. No. 62/691,773 filed Jun. 29, 2018.

FIELD OF THE INVENTION

The invention relates to solid laundry fabric softening compositions and applications of use. In particular, the solid laundry fabric softening compositions combine quaternary ammonium compounds, such as quaternary dialkyl actives with low iodine values and silicone to provide softness without causing any significant yellowing or loss of water absorption or wicking to the treated linen. Beneficially, the solid laundry fabric softening compositions can be provided as a multi-use block having uniform dispensing rates and without block weeping or sloughing. The combination of processing aids for solidification comprising one or more of (A) polyethylene glycol and an acidulant, (B) a surfactant and an acidulant, or (C) polyethylene glycol, a surfactant and an acidulant, are combined with the quaternary ammonium compounds and silicone to provide the stable solid composition. The processing aids for solidification can also include a water soluble salt that is not hygroscopic and/or a stabilizer.

BACKGROUND OF THE INVENTION

It is well known that textiles which have been laundered using alkaline detergents and strong mechanical action, either in automatic or manual washing processes, can develop an unpleasant hardened or rough feel after drying. This can be overcome by treating the textiles after washing in a rinsing bath with conditioning—or fabric softening—compositions to bring back softness to the touch. Fabric softener compositions are commonly used to deposit a fabric softening compound onto fabric. Typically, such compositions contain a cationic fabric softening agent dispersed in water. These fabric softening compositions are most often liquid compositions that are delivered into the rinsing bath through a dispenser, in an automatic process, or directly, in a manual process. Rinse-added liquid softeners have certain benefits. For example, they are easy to handle, e.g., easy to dispense and to measure. The liquid softeners also minimizes the potential for concentrated deposition of the softener on an area of a fabric to cause visible staining. To facilitate the use of liquid softeners, some automatic clothes washers built with an automatic fabric softener dispenser require the fabric softener in liquid form for proper dispensing.

On the other hand, liquid fabric softener compositions contain a high level of water. The traditional liquid fabric softener products normally contain about 90% to about 95% of water. These products require a great amount of packaging material, the transport of large weight (making shipping expensive), and large shelf space in the retail stores. Recent trends to produce concentrated fabric softeners, with the intention of reducing waste, have improved the environmental impact and decreased the water content in the liquid compositions to about 72% to 80%, which is still a significant amount of water. However, all liquid formulations also have the further disadvantage that the formulations can become unstable upon long term storage, leading to separation of the ingredients. Liquid formulations can also suffer from extremes of storage temperature, such as both freezing or extremely warm temperatures.

There is a need in the art for improved solid fabric softener compositions. The benefits of solid compositions include: the compactness of the compositions permit the transport of less weight, making shipping more economical; less packaging is required so that smaller and more readily disposable containers can be used; there is less chance for messy leakage; and less shelf space is required in the retail stores. Solid formulations are also more stable to storage, and extremes of temperature.

Despite the many advantages of a solid composition, it is still a challenge to develop a formulation of a solid softener that has a performance comparable to a liquid softener with the same kind and amount of active content. The first challenge in producing a solid softener is developing a formulation that will not melt, "weep", or separate during typical storage and transport temperatures. Many preferred softening actives that are biodegradable, such as triethanolamine diester quats (one example of which is methyl bis(ethyl tallowate)-2-hydroxyethyl ammonium methyl sulfate), have a low melting point and are semi-solid at room temperature, and are much harder to formulate into a non-weeping product. As a result, common actives for liquid softeners are not suitable for use in formulating solid compositions.

An additional challenge in producing a solid softener composition is developing a formulation that will have an adequate dispense rate when sprayed with water. Many common actives for fabric softening are hydrophobic and result in low dispensing rates which is undesirable. If the dispense rate is too slow it will not be possible to deliver the required amount of formulation during the normal rinse cycle. Another dispensing challenge is 'weeping' and sloughing of the solid composition, including during dispensing or during storage in between dispensing in the humid environment of a dispenser. As such there is a need for compositions and methods to formulate and use solid fabric softener compositions to overcome these challenges.

Accordingly it is an object herein to provide a solid fabric softener composition that performs at least as well as traditional liquid compositions including softness without causing yellowing or loss of water absorption (i.e. wicking).

It is yet another object herein to provide a solid fabric softener that will have an adequate dispense rate when sprayed with water over conventional temperatures for dispensing a multi-use solid composition, such as a solid block.

It is yet another object herein to provide a solid fabric softener than does not "weep" or separate during typical storage and transport temperatures.

It is yet another object herein to provide a solid fabric softener than does not "weep" or slough during dispensing or between dispensing cycles.

Other objects, advantages and features will become apparent from the following specification taken in conjunction with the accompanying drawings.

BRIEF SUMMARY OF THE INVENTION

An advantage of the solid fabric softening compositions and methods of use thereof, is that a solid fabric softening compositions provides a multi-use composition without weeping and/or sloughing and providing a desired dispensing rate of a product that provides premium softness without causing yellowing or other fabric discoloration.

In an embodiment, a multi-use solid laundry fabric softening composition comprises: a quaternary ammonium compound with an iodine value less than or equal to 15; a silicone, wherein the ratio of the quaternary ammonium compound to the silicone is from about 3:1 to about 1.8:1; at least one processing aid for solidification comprising one or more of a polyethylene glycol, a surfactant, and/or an acidulant, wherein the solid laundry fabric softening composition is a non-weeping solid at a temperature of up to 120° F. as measured by less than about 10 gram loss per 100 grams.

In a further embodiment, a multi-use solid laundry fabric softening composition comprises: a quaternary ammonium compound with an iodine value less than or equal to 15 and having the following formula:

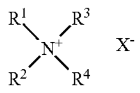

wherein R1 and R2 represent the same or different hydrocarbyl groups having from 12 to 24 carbon atoms, $R^3$ and $R^4$ represent the same or different hydrocarbyl groups containing 1 to about 4 carbon atoms, and X is an anion; a silicone, wherein the ratio of the quaternary ammonium compound to the silicone is from about 3:1 to about 1.8:1; at least one processing aid for solidification comprising a nonionic alcohol ethoxylate surfactant having an HLB between about 10-15, a stabilizer comprising a long chain fatty acid or a derivative of a long chain fatty acid, and one or more of polyethylene glycol, an acidulant, a water soluble salt that is not hygroscopic and may comprise one or more of sodium citrate, sodium monocitrate, and magnesium sulfate, wherein the solid laundry fabric softening composition is a non-weeping solid at a temperature of up to 120° F. as measured by less than about 10 gram loss per 100 grams.

In a still further embodiment, a method for treating fabric in a wash wheel comprises providing a solid laundry fabric softening composition as described herein; contacting the solid laundry fabric softening composition with water to form an aqueous suspension; and dispensing the aqueous suspension to a wash wheel, where it contacts the fabric to be treated.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION OF THE PREFERRED EMBODIMENT

The embodiments are not limited to particular solid fabric softening compositions and dispensing thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "hygroscopic" as used herein refers to the ability of a material to take up and retain moisture. As referred to herein "non-hygroscopic" or "not hydroscopic" refers to a material or composition containing a material that when exposed to moisture, such as humidity, does not absorb moisture in an amount that would cause the material or composition to become liquid. Hygroscopic materials cause the solid to absorb water, resulting in a softer solid with lower penetrometer value in this context.

The term "laundry", "linen," "fabric," and/or "textile" as used herein refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillowcases, towels, table linen, tablecloth, bar mops and uniforms.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "sloughing" refers to large pieces or chunks of material falling out of or away from a solid composition during dispensing when water is used to bring a portion of a solid composition into an aqueous solution for dispensing. The pieces or chunks of solid material fall off the solid during or between dispensing in an unintentional and/or uncontrolled manner when the solid composition is softened by the dispensing water.

The term "solid" refers to a composition in a generally shape-stable form under expected storage conditions, for example a powder, particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as less hard. In a preferred embodiment, the solid composition is a solid block and not loose powder or flowable powder.

The term "water soluble" refers to a compound that can be dissolved in water at a concentration of more than 1 wt. %.

As used herein, the term "weeping" refers to a predictive assessment for sloughing in a small scale sample size. As referred to herein, in weeping studies, a small scale solid composition is kept inverted in an enclosed hot water bath (to simulate hot and humid conditions) over an extended time period to soften and loosen the solid composition. Weeping is measured by a high degree of sample softness and mass loss, which are indicators of sloughing concerns. A measurement for weeping according to the described solid compositions is based upon the mass loss of the solid composition evaluated. A non-weeping block is one that loses less than about 10 grams per 100 grams (10%) at a temperature of up to 120° F. for 72 hours.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The compositions and methods described herein may comprise, consist essentially of, or consist of the components and ingredients as well as other ingredients described herein. As used herein, "consisting essentially of" means that the compositions and methods may include additional steps, components or ingredients, but only if the additional steps, components or ingredients do not materially alter the basic and novel characteristics of the claimed compositions and methods. It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Solid Fabric Softener Compositions

The solid fabric softener compositions according to the disclosure comprise, consist of, and/or consist essentially of a low iodine value quaternary ammonium compound (iodine value of 15 or less), a silicone, at least one processing aid for solidification, and optionally a salt and/or additional functional ingredients.

Exemplary ranges of the solid fabric softener compositions are shown in Tables 1A-1C in weight percentage of the solid compositions.

TABLE 1A

| Material | First Exemplary Range wt-% | Second Exemplary Range wt-% | Third Exemplary Range wt-% | Fourth Exemplary Range wt-% |
|---|---|---|---|---|
| Quaternary Ammonium Compound | 1-30 | 1-25 | 5-25 | 5-15 |
| Silicone | 0.5-20 | 1-20 | 1-10 | 1-5 |

TABLE 1A-continued

| Material | First Exemplary Range wt-% | Second Exemplary Range wt-% | Third Exemplary Range wt-% | Fourth Exemplary Range wt-% |
|---|---|---|---|---|
| Processing Aid For Solidification | 5-60 | 5-50 | 5-40 | 10-40 |
| Additional Functional Ingredients | 0-50 | 0.1-40 | 1-30 | 1-20 |

TABLE 1B

| Material | First Exemplary Range wt-% | Second Exemplary Range wt-% | Third Exemplary Range wt-% | Fourth Exemplary Range wt-% |
|---|---|---|---|---|
| Quaternary Ammonium Compound | 1-30 | 1-25 | 5-25 | 5-15 |
| Silicone | 0.5-20 | 1-20 | 1-10 | 1-5 |
| PEG | 5-25 | 5-20 | 5-15 | 5-10 |
| Salt | 0-50 | 5-50 | 10-40 | 15-40 |
| Acidulant | 1-60 | 1-50 | 5-40 | 10-40 |
| Additional Functional Ingredients | 0-50 | 0.1-40 | 1-30 | 1-20 |

TABLE 1C

| Material | First Exemplary Range wt-% | Second Exemplary Range wt-% | Third Exemplary Range wt-% | Fourth Exemplary Range wt-% |
|---|---|---|---|---|
| Quaternary Ammonium Compound | 1-30 | 1-25 | 5-25 | 5-15 |
| Silicone | 0.5-20 | 1-20 | 1-10 | 1-5 |
| PEG | 0-25 | −20 | 0-15 | 0-10 |
| Salt | 0-50 | 5-50 | 10-40 | 15-40 |
| Surfactant | 0-25 | −20 | 0-15 | 0-10 |
| Acidulant | 1-60 | 1-50 | 5-40 | 10-40 |
| Additional Functional Ingredients | 0-50 | 0.1-40 | 1-30 | 1-20 |

Quaternary Ammonium Compounds

Quaternary ammonium compounds have long been known in the art for their fabric softening capabilities in liquid formulations, and have the following general formula:

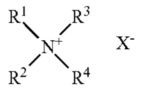

wherein $R^1$, $R^2$, $R^3$, and $R^4$ can each be C1-C24 aliphatic, normal or branched saturated or unsaturated hydrocarbon groups, alkoxy groups (R—O—), polyalkoxy groups, benzyl groups, allyl groups, hydroxyalkyl groups (HOR—), and the like, and X is an anion, preferably selected from halide, methyl sulphate or ethyl sulphate radicals. The quaternary ammonium compounds can include any anion or counter ion that allows the component to be used in a manner that imparts fabric-softening properties. Exemplary counter ions include chloride, methyl sulfate, ethyl sulfate, and sulfate.

In preferred aspects of the solid fabric softening compositions, the quaternary ammonium compounds have the following general formula:

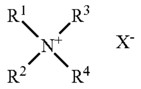

wherein $R^1$ and $R^2$ represent the same or different hydrocarbyl groups having from about 12 to about 24 carbon atoms, preferably from about 12 to about 22 carbon atoms, more preferably from about 14 to about 22 carbon atoms, or still more preferably from about 14 to about 20 carbon atoms; $R^3$ and $R^4$ represent the same or different hydrocarbyl groups containing about 1 to about 4 carbon atoms; and X is any suitable anion, such as a halide. The preferred quaternary ammonium compounds have highly saturated carbon backbones (i.e. high degree of saturation of alkyl groups) of the hydrocarbyl groups. As referred to herein, “highly saturated” carbon backbones are represented by a low iodine value of the quaternary ammonium compounds, namely an iodine value equal to 15 or less. High iodine value quaternary ammonium compounds have an iodine value greater than 15 and are not suitable for inclusion in the solid compositions disclosed herein. Without being limited to a particular mechanism of action, quaternary ammonium compounds having an iodine value equal to 15 or less provide highly saturated alkyl chain or alkyl backbone of a quaternary ammonium compound. Unlike liquid formulations where a high degree of unsaturation is required for liquid stability and processability, the solid compositions cannot include highly unsaturated quaternary ammonium compounds as they are increasingly soft based on the higher degree of unsaturation and not suitable for the solid compositions.

Representative examples of these quaternary ammonium compounds include, for example, di(tallow alkyl)dimethyl ammonium methyl sulphate; dihexadecyl dimethyl ammonium chloride; di(hydrogenated tallow alkyl)dimethyl ammonium chloride; dioctadecyl dimethyl ammonium chloride; di(hydrogenated tallow alkyl)dimethyl ammonium methyl sulphate; dihexadecyl diethyl ammonium chloride; di(coconut alkyl)dimethyl ammonium chloride; ditallow alkyl dimethyl ammonium chloride; and di(hydrogenated tallow alkyl)dimethyl ammonium chloride, and combinations thereof.

Further representative examples of quaternary ammonium compounds useful in the solid fabric softening composition include but are not limited to mono-C8-C24 alkyl trimethyl quaternary ammonium compounds, monomethyl tri-C8-24 alkyl quaternary ammonium compounds, imidazolinium quaternary ammonium compounds, dimethyl-C8-24 alkylbenzyl quaternary ammonium compounds, complex di quaternary ammonium compounds, di-C8-24 alkyl dimethyl quaternary ammonium compounds, mono or dialkyl di or trialkoxy quaternary ammonium compounds, mono or dialkyl di or tripolyalkoxy quaternary ammonium compounds, (the alkoxy group being a methoxy, ethoxy or propoxy group or a hydroxyethyl or hydroxypropyl; the polyalkoxy being polyethoxy or polypropoxy group with 2-50 alkoxy groups), diamidoamine-methyl-C8-C22 alkyl-quaternary ammonium compounds, and di-C8-C22 alkyl methyl benzyl quaternary ammonium compounds.

The solid fabric softening compositions can preferably include a quaternary ammonium compound having sufficient saturated hydrocarbon groups, such as the alkyl groups, to have an iodine value equal to 15 or less. In a further embodiment, the solid fabric softening compositions can preferably include a dialkyl quaternary ammonium compound having saturated alkyl groups for $R^1$ and $R^2$ having from about 8 to about 24 carbon atoms, from about 12 to about 24 carbon atoms, preferably from about 12 to about 22 carbon atoms, more preferably from about 14 to about 22 carbon atoms, or still more preferably from about 14 to about 20 carbon atoms. In a preferred aspect, the dialkyl quaternary ammonium compound is a di(hydrogenated tallowalkyl)dimethyl ammonium chloride (DHTDMAC) or an ester quat.

The solid fabric softening compositions can preferably include an amidoamine quaternary ammonium compound, including for example diamidoamine quaternary ammonium compounds. Exemplary diamidoamine quaternary ammonium compounds are available under the name Varisoft®. Exemplary amidoamine quaternary ammonium compounds include methyl-bis(tallow amidoethyl)-2-hydroxyethyl ammonium methyl sulfate, methyl bis(oleylamidoethyl)-2-hydroxyethyl ammonium methyl sulfate, and methyl bis (hydr.tallowamidoethyl)-2-hydroxyethyl ammonium methyl sulfate.

The solid fabric softening compositions can preferably include an imidazolinium quaternary compound. Exemplary imidazolinium quaternary ammonium compounds include methyl-lhydr. tallow amido ethyl-2-hydr. tallow imidazolinium-methyl sulfate, methyl-1-tallow amido ethyl-2-tallow imidazolinium-methyl sulfate, methyl-1-oleyl amido ethyl-2-oleyl imidazolinium-methyl sulfate, and 1-ethylene bis(2-tallow, 1-methyl, imidazolinium-methyl sulfate).

The solid fabric softening compositions can preferably include an alkylated quaternary compound. Exemplary alkylated quaternary ammonium compounds include ammonium compounds having an alkyl group containing between 6 and 24 carbon atoms. Exemplary alkylated quaternary ammonium compounds include monoalkyl trimethyl quaternary ammonium compounds, monomethyl trialkyl quaternary ammonium compounds, and dialkyl dimethyl quaternary ammonium compounds. The alkyl group is preferably C12-C24, C14-C24, C14-C22, or C14-C20 group that is aliphatic and saturated, straight or branched.

The solid fabric softening compositions can preferably include an ester quaternary compound. Ester quats refer to a compound having at least two or more alkyl or alkenyl groups connected to the molecule via at least one ester link. An ester quaternary ammonium compound can have at least one, or can have two or more ester links present. Exemplary ester quaternary ammonium compounds include for example, di-alkenyl esters of triethanol ammonium methyl sulphate and N,N-di(tallowoyloxy ethyl)N,N-dimethyl ammonium chloride, polyol ester quat (PEQ). Commercial examples of compounds include, but are not limited to, di-oleic ester of triethanol ammonium methyl sulphate, di-oleic ester of triethanol ammonium methyl sulphate, partially hardened tallow ester of triethanol ammonium ethyl sulphate, palm ester of triethanol ammonium methyl sulphate, hardened tallow ester of triethanol ammonium methyl sulphate, unsaturated carboxylic acid reaction products with triethanolamine dimethyl sulphate quaternized. Further examples include triethanolamine (TEA) ester quats (e.g., methyl bis(ethyl tallowate)-2-hydroxyethyl ammonium methyl sulfate), methyldiethanolamine (MDEA) ester quats, diamidoquats (e.g., methyl bis(hydrogenated tallow amidoethyl)-2-hydroxyethyl ammonium methyl sulfate), and dialkyldimethyl quats (e.g., dihydrogenated tallow dimethyl ammonium chloride). Preferred ester quats are those made from the reaction of alkyl carboxylic acid fraction, methyl ester and triglyceride with triethanolamine. Additional description of the ammonium quaternary fabric softening actives is disclosed in U.S. Pat. No. 4,769,159, which is herein incorporated by reference.

The ammonium quaternary fabric softening active employed has a low iodine value. Iodine values are a measurement of unsaturation of the alkyl chain or alkyl backbone of a quaternary ammonium compound. In an embodiment an iodine value of 15 or less, less than about 15, less than about 14, less than about 13, less than about 12, less than about 11, less than about 10, less than about 9, less than about 8, less than about 7, less than about 6, less than about 5, less than about 4, less than about 3, less than about 2, less than about 1, or even 0, and provides the beneficial solid quat formulations in combination with the silicone actives described herein. Iodine values can be calculated according to ASTM D5554-15, Standard Test Method for Determination of the Iodine Value of Fats and Oils wherein the same method is used for determining the iodine value of an alkyl chain or alkyl backbone of a quaternary ammonium compound.

In an embodiment one or more of the quaternary ammonium compounds can be included in the solid composition. The ammonium quaternary fabric softening active is present at a level in the range of from about 1 wt-% to about 30 wt-%, preferably from about 1 wt-% to about 25 wt-%, preferably from about 5 wt-% to about 25 wt-%, and most preferably from about 5 wt-% to about 15 wt-% by weight based on the total weight of the solid fabric softener composition.

Silicone

The solid fabric softening compositions include at least one silicone compound. Suitable silicones include an organosilicone, such as: a polyalkyl silicone, an aminosilicone, a siloxane, a polydimethyl siloxane, an ethoxylated organosilicone, a propoxylated organosilicone, an ethoxylated/propoxylated organosilicone, and mixtures thereof. In one embodiment, the organosilicone is an aminofunctional silicone.

Organosilicones not only provide softness and smoothness to fabrics, but also provide a substantial color appearance benefit to fabrics, especially after multiple laundry washing cycles. Exemplary organosilicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. In one aspect, the organosilicones may comprise a viscosity of from about 10 to about 2,000,000 centistokes at 25° C. In another aspect, suitable organosilicones may have a viscosity of from about 10 to about 800,000 centistokes at 25° C. Suitable organosilicones may be linear, branched or cross-linked. Suitable organosilicones may be in the form of neat liquids, combinations with solvents, or emulsions in water. If aqueous emulsions are used, the preferred silicones are as concentrated as possible to minimize the amount of liquid added to the composition, since large amounts of liquid can complicate the solidification process.

A linear or branched structured silicone polymer can also be used in the solid fabric softening compositions. The silicone of the present invention can further be a single polymer or a mixture of polymers. In a preferred aspect the silicone is an amino-functional silicone which can be a linear or branched structured amino-functional silicone polymer and can further be a single polymer or a mixture of polymers, including a mixture of polymers wherein one of the polymers contains no amino functionality, e.g., a polydimethylsiloxane polymer.

In a preferred aspect, the silicone does not include ester based polysiloxanes. In particular, the ester based polysiloxanes include those polymers with a cleavable bond as described in U.S. Publication No. 2019/0024018, the disclosure of which is incorporated by reference. These polysiloxanes excluded from the silicone compound of the solid compositions include siloxane polymers having at least one unit of the following formula (I):

Formula I

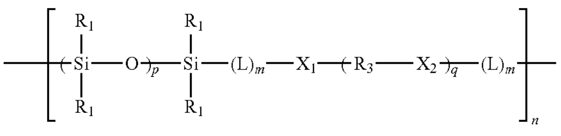

(a) wherein: L is a linking bivalent alkylene radical, each $R_2$ is independently selected from the group consisting of H, $C_1$-$C_4$ alkyl, substituted alkyl, aryl, substituted aryl, and combinations thereof, each s is independently an integer of from 2 to about 12; each y is independently an integer of from 1 to about 100, (b) each $X_1$ and $X_2$ is independently selected from the group consisting of:

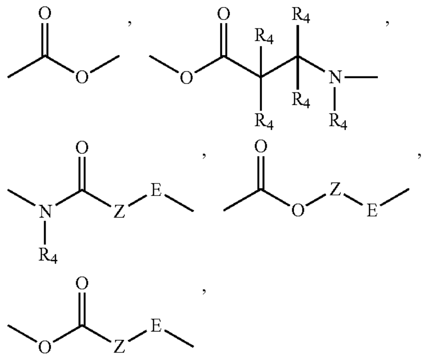

E=electron withdrawing group, each of $R_4$ moiety is independently selected from the group consisting of H, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl; and each Z is independently selected from the group consisting of:

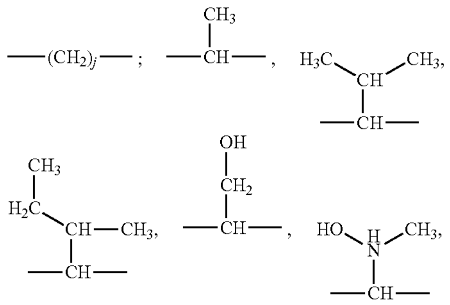

-continued

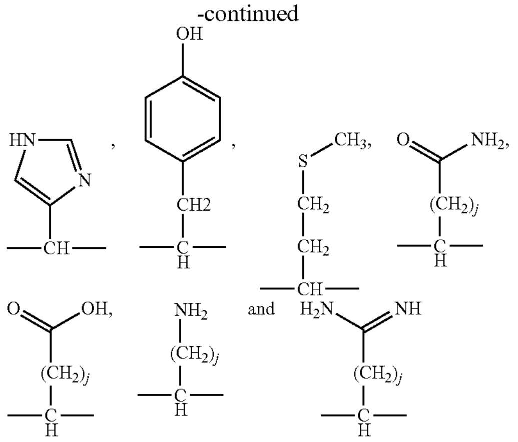

and the index j is an integer from 1-32, (c) each $R_1$ is independently selected from the group consisting of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy, (d) each $R_3$ is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, (e) each index m is one or zero, (f) each q is 1 or zero, (g) each index p is an integer of from about 2 to about 1000, and (h) the index n is an integer of from about 1 to about 50.

The silicone is present at a level in the range of from about 0.5 wt-% to about 20 wt-%, preferably from about 1 wt-% to about 20 wt-%, and most preferably from about 1 wt-% to about 10 wt-% by weight based on the total weight of the solid fabric softener composition.

Without being limited to a particular mechanism of action the ratio of the dialkyl quaternary ammonium compound to the silicone in the solid fabric softener composition provides efficacious softening without deleterious effects on treated surfaces when provided in a ratio less than about 3:1, preferably from about 2.4:1 to about 1.8:1, or most preferably from about 2:1.

Processing Aid for Solidification

The solid fabric softening compositions also include at least one, at least two, or at least three processing aids for solidification. The processing aids for solidification participate in maintaining the compositions in a solid form. Although other components of the solid composition may also be solids, the solidification agent can maintain the overall composition, including solid and liquid components, in a solid form. In an embodiment, the solid form of the solid fabric softening compositions referred to herein is a solid block and not loose powder or flowable powder. The processing aids can provide other advantageous features to the compositions. For example, the processing aids can reduce the weeping or sloughing of the solid fabric softening compositions during dispensing and use. The processing aids can comprise, consist of or consist essentially of one or more polyethylene glycol, a surfactant, an acidulant (such as a long chain fatty acid or its salt), stabilizing agent, and/or a salt.

In an embodiment, the processing aid for solidification includes one or more non-deliquescent materials. Beneficially, including a non-deliquescent material provides a non-hygroscopic material such that when the solid composition is exposed to humidity (such as during the dispensing of a solid composition) the composition does not absorb water or does not absorb sufficient water to become liquid. This is important due to the dispensing challenges, namely humid environments that the solid compositions are exposed to.

Polyethylene Glycol

Suitable processing aids for solidification include at least one solid polyethylene glycol (PEG) or PEG derivative. In some embodiments, one or more PEG can be included in the solid fabric softening compositions. For example PEG 200 up to PEG 20,000. In certain embodiments, the PEG includes at least one of PEG 200, PEG 400, PEG 600, PEG 800, PEG 1,000, PEG 2,000, PEG 3,000, PEG 4,000, PEG 5,000, PEG 6,000, PEG 7,000, PEG 8,000, PEG 9,000, PEG 10,000, and derivatives and the like. In certain embodiments, the PEG includes a combination of at least two of PEG 200, PEG 400, PEG 600, PEG 800, PEG 1,000, PEG 2,000, PEG 3,000, PEG 4,000, PEG 5,000, PEG 6,000, PEG 7,000, PEG 8,000, PEG 9,000, PEG 10,000, and derivatives and the like. In another embodiment the processing aid for solidification can include methoxy poly(ethylene glycol). In a preferred embodiment two or more PEG having different molecular weights are included in the solid fabric softening compositions. In another preferred embodiment MPEG (methoxy poly(ethylene glycol)) is employed as the processing aid, which can be combined with other processing aids.

The PEG is present at a level in the range of from about 0 wt-% to about 25 wt-%, from about 5 wt-% to about 25 wt-%, preferably from about 5 wt-% to about 20 wt-%, and most preferably from about 5 wt-% to about 15 wt-% by weight based on the total weight of the solid fabric softener composition.

Salts

Salts may also be included in the solidification matrix, preferably water soluble salts. Salts, including water soluble salts, can be either organic or inorganic. Water soluble salts include a salt of a polycarboxylic acid, which is an acid with more than one carboxylate group, including for example diacids and triacids such as citrate. Water soluble salts include salts of acids such as carboxylic acids (aliphatic, acetic, formic), aromatic (benzoic, salicylic) or dicarboxylic acids such as oxalic, phthalic, sebacic, adipic, glutaric; tricarboxylic acids such as citric acid, carboxylic acids such as aliphatic (oleic, palmitic, stearic), or aromatic (phenylstearic), or even water soluble amino acids or salts such as those having sodium, potassium, aluminum, magnesium, titanium, ammonium, triethanolamine, diethanolamine and/or monoethanolamine as the cation. Salts can also include neutral salts, including for example, sulphates and the like. A preferred salt of an acid is sodium citrate and/or monosodium citrate.

The salt is present at a level in the range of from about 0 wt-% to about 50 wt-%, from about 5 wt-% to about 50 wt-%, from about 5 wt-% to about 50 wt-%, from about 10 wt-% to about 50 wt-%, preferably from about 15 wt-% to about 50 wt-%, preferably from about 20 wt-% to about 40 wt-%, and most preferably from about 25 wt-% to about 40 wt-% by weight based on the total weight of the solid fabric softener composition.

Acidulants

The solid fabric softening compositions may also include an acidulant. The acid has to be compatible with the other ingredients in the composition. One or more acidulants can be included in the solid fabric softening compositions.

A wide range of acidic materials can be used including, but not limited to: oxalic acid, citric acid, gluconic acid, tartaric acid, nitrilotriacetic acid, ethylenediamine tetraacetic acid, amino tri(methylene phosphonic) acid, 1-hydroxyethylidine-1,1-diphosphonic acid, hexamethylene diamine tetra(methylene phosphonic acid), ammonium or sodium bifluoride, ammonium or sodium silicofluoride, ammonium or sodium bisulfate, ammonium or sodium bisulfite, hydroxyacetic acid, phosphoric acid, sulfamic acid.

In an embodiment, a preferred class of acidulants are polycarboxylic acids such as dicarboxylic acids. The acids which are preferred include adipic, glutaric, succinic, and mixtures thereof. A preferred acidulant is a mixture of adipic, glutaric and succinic acid, which is a raw material sold by BASF under the name SOKALAN® DCS.

In some applications, it is preferred to use an acid that not only affects the pH, but also is capable of chelating iron over the pH range of 2 to 8. Dissolved iron in both ferric and ferrous oxidation states is found in many water supplies used for laundering fabrics. Iron can enter the water supply from the water source whether groundwater or surface water or from iron pipes either used in the municipal water supply or for plumbing at the site. Even small amounts of dissolved iron, less than 0.5 ppm, can cause white fabrics to yellow or colored fabrics to discolor over time. Water softening equipment used to remove the calcium and magnesium ions from hard water does not completely remove troublesome iron ions from the water. Preferred iron chelating acids include citric acid, gluconic acid and amino tri(methylene phosphonic acid). Citric acid is the most preferred acid material since it acidifies, buffers in the proper range, chelates iron and is mild to fabrics and skin.

The acidulant concentration in the composition range from about 0 wt-% to about 60 wt-%, from about 1 wt-% to about 60 wt-%, from about 1 wt-% to about 50 wt-%, from about 5 wt-% to about 40 wt-% preferably, from about 10 wt-% to about 40 wt-%, or preferably from about 20 wt-% to about 40 wt-%.

Additional Functional Ingredients

The components of the solid fabric softening compositions can further be combined with various functional components suitable for use in laundry softening applications. In some embodiments, the solid fabric softening composition including the quaternary ammonium compound, silicone, and processing aids for solidification make up a large amount, or even substantially all of the total weight of the solid composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution or suspension, provides a beneficial property in fabric softening and/or maintaining stability and suitable dispensing of the solid composition. Some particular examples of functional materials are discussed in more detail below, although the particular materials discussed are given by way of example only, and that a broad variety of other functional ingredients may be used.

In preferred embodiments, the compositions include a corrosion inhibitor. In other embodiments, the compositions may include additional salts, defoaming agents, anti-redeposition agents, solubility modifiers, dispersants, stabilizing agents, sequestrants and/or chelating agents, surfactants (including nonionic surfactants), anti-wrinkling agents, optical brighteners, fragrances and/or dyes, rheology modifiers or thickeners, hydrotropes or couplers, buffers, solvents, enzymes, soil-release agents, dye scavengers, starch/crisping agent, germicides/fungicides, antioxidants or other skin care components, sanitizers and components for residual protection, and the like.

Surfactants

The solid composition may also include optional wetting agents or surfactants. In some embodiments surfactant(s) is included as a processing aid for solidification. In some embodiments, the surfactant can replace at a least a portion of another processing aid for solidification, such as PEG.

Preferably, surfactants utilized include those selected from water soluble or water dispersible nonionic, semi-polar nonionic, cationic, anionic or any combination thereof. In an embodiment, nonionic or cationic surfactants are preferred due to compatibility with quaternary ammonium compounds. In particular, nonionic surfactants with HLB values between about 10 to about 15 are preferred. HLB (Hydrophilic Lipophilic Balance) refers to a surfactant's solubility in water. An HLB scale was derived as a means for comparing the relative hydrophilicity of amphiphilic molecules. Molecules with an HLB value of 10 or greater indicate that the molecule is hydrophilic and soluble in water. Molecules with an HLB value less than 10 indicate that the molecule is hydrophobic and insoluble in water. The HLB system is well known to skilled surfactant chemists and is explained in the literature such as in the publication, "The HLB System," ICI Americas (1987). A representative listing of the classes and species of surfactants as may be useful herein for the fabric softener composition appears in U.S. Pat. No. 3,664,961 and Kirk-Othmer, Encyclopedia of Chemical Technology, Third Edition, volume 8, which are incorporated herein by reference in their entirety.

Nonionic Surfactants

Also useful in the present invention are surface active substances which are categorized as nonionics. Preferred nonionic surfactants useful in the solid compositions, include alcohol ethoxylate surfactants. Non-limiting examples of commercially available alcohol ethoxylate nonionic surfactants include: Tomadol 25-7 available from Tomah; Dehypon LS 54 available from Henkel; Pluronic N-3, Plurafac LF-221, Plurafac D-25, and SLF-18 available from BASF. Additional Pluronics may include block copolymers, such as Pluronics F-108 (Poly(ethylene glycol)-block-poly(propylene glycol)-block-poly(ethylene glycol)).

Useful Nonionic Surfactants Include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Utensil™, Dehydol™ manufactured by BASF, Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of Nonionic Low Foaming Surfactants Include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional Examples of Effective Low Foaming Nonionics Include:

7. The alkylphenoxypolyethoxyalkanols of U.S. Pat. No. 2,903,486 issued Sep. 8, 1959 to Brown et al. and represented by the formula

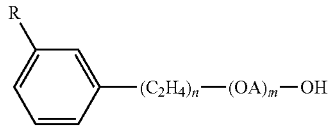

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula Z[(OR)nOH]z wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms, more preferably between 10 and 18 carbon atoms, most preferably between 12 and 16 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R^7$ is independently hydrogen, $C_1$-$C_4$ alkyl, $C_1$-$C_4$ hydroxyalkyl, or $—(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_S N$-$(EO)_t H$, $R^{20}$—$(PO)_S N$-$(EO)_t H(EO)_t H$, and $R^{20}$—$N(EO)_t H$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_v$—$N[(EO)_w H][(EO)_z H]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Anionic Surfactants

Also useful in the compositions are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. Anionic surfactants can be added in an amount between about 1 wt. % and about 10 wt. %; more preferably between about 1 wt. % and about 5 wt. %.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a C8 to C22 alkyl group or

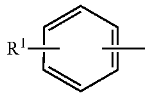
, in which R1 is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1.

In other embodiments, R is

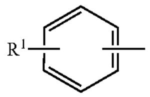
, and R1 is a C6-C12 alkyl group. In still yet other embodiments, R1 is a C9 alkyl group, n is 10 and m is 1. Such alkyl and alkylaryl ethoxy carboxylates are commercially available. These ethoxy carboxylates are typically available as the acid forms, which can be readily converted to the anionic or salt form.

Cationic Surfactants

Also useful in the compositions are surface active substances which are categorized as cationic surfactants if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Amine oxide cationic surfactants are not included in cationics suitable for use in the solid compositions described herein. Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The simplest cationic amines, amine salts and quaternary ammonium compounds can be schematically drawn thus:

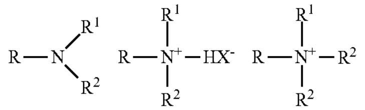

in which, R represents an alkyl chain, R', R'', and R''' may be either alkyl chains or aryl groups or hydrogen and X represents an anion.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like.

Cationic surfactants useful in the compositions include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

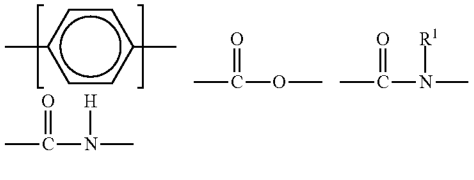

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

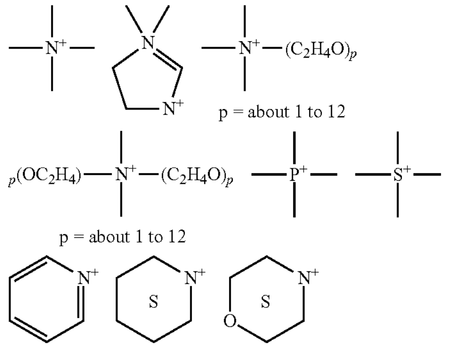

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Stabilizing Agent

The solid composition may also include a medium to long chain fatty carboxylic acid as a stabilizer. In some embodiments the stabilizer is included as a processing aid for solidification. Exemplary fatty acids, such as a free fatty acids can be employed and the term "fatty acid" is used herein in the broadest sense to include unprotonated or protonated forms of a fatty acid. One skilled in the art will readily appreciate that the pH of an aqueous composition will largely determine whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise). The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms. The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids. Mixtures of fatty acids from different fat sources can be used.

Suitable carboxylic acids may be saturated or unsaturated, but are preferably saturated carboxylic acids. These carboxylic acids have from about 10 to about 22 carbon atoms on the alkyl or alkenyl chain, and are in either straight chain or branched chain configuration, preferable carboxylic acids are in straight chain configuration having from about 14 to about 22 carbon atoms. Non-limiting examples of useful carboxylic acids include stearic acid (C18), palmitic acid (C16) or behenic acid (C22). Additional examples include long chain fatty acids or its salt, such as stearic acid, palmitic acid, coco fatty acid, stearic monoethanolamide, coco-monoethanolamide, and the like.

Additional stabilizing agents can include SMEA (stearic monoethanolamide). Various hydrophobic species that are solid at room temperature are suitable for use as stabilizing agents, including but not limited to: palmitic acid, coco fatty acid, stearic monoethanolamide, coco-monoethanolamide, fatty acids described above. Preferred stabilizing agents have a solubility between 4 ppm and 10,000 ppm in water at 45° C. and a melting point above 50° C.

The stabilizer is present at a level of from about 0% to about 5.0% by weight based on the total weight of the composition preferably from about 0.5% to about 4.5%, and most preferably from about 1% to about 4% by weight based on the total weight of the solid fabric softener composition.

Salt for Conductivity

The solid composition may also include at least one additional salt. In an embodiment, the additional salt is a salt for conductivity and/or is an inorganic anion or non-sequestering organic anion to allow for standard measurements of conductivity of the wash solution. Sodium chloride is preferably used, however a wide variety of ionizable salts can be used. Examples of suitable salts are the halides and acetates of the group IA metals of the Periodic Table of the Elements, for example, lithium chloride, sodium chloride, potassium chloride, ammonium chloride, sodium bromide, potassium bromide, calcium bromide, sodium iodide, potassium iodide, sodium acetate, potassium acetate, or mixtures thereof. Sodium chloride is preferred. The ionizable salts are particularly useful during the process of mixing the ingredients to make the compositions herein, and later to obtain the desired conductivity for measurement of dispersement rates of the softening composition. The amount of ionizable salts used depends on the amount of active ingredients used in the compositions and can be adjusted according to the desire of the formulator.

In a preferred embodiment, a salt for conductivity included in the solid compositions preferably has a solubility of at least about 5 ppm at 45° C. In preferred embodiments, a salt for conductivity included in the solid compositions preferably has a solubility above stearic acid.

The salt for conductivity, such as sodium chloride can be present at a level of from about 0% to about 60% by weight based on the total weight of the composition preferably from about 1% to about 50% by weight based on the total weight of the solid fabric softener composition.

Dispersant

A dispersant may be included to help remove soils and microorganisms from articles and surfaces. Examples of dispersants include, but are not limited to, to water soluble polymers, surfactants, hydrotropes, and wetting agents. In a preferred embodiment the dispersant is an anionic surfactant. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Fragrance

The solid composition may also include any softener compatible fragrance/perfume. Suitable perfumes are disclosed in U.S. Pat. No. 5,500,138, said patent being incorporated herein by reference.

Solid Compositions

The solid laundry fabric softening compositions are preferably multi-use solid compositions formed by combining the components in the weight percentages and ratios disclosed herein. The solid compositions are provided as a solid and a use solution, wherein the use solution is a suspension, is formed during the dispensing and/or laundering process.

The solid compositions are substantially homogeneous with regard to the distribution of ingredients throughout its mass and are dimensionally stable.

The solid compositions can be a cast or extruded solid. The resulting solid may take forms including, but not limited to pellet, block, or tablet. In a preferred embodiment the solids do not include loose or flowable powders, the compositions are solid blocks with dimensional stability, as measured by a growth exponent of less than 3% if heated to a temperate of 120 F taking into account change in any dimension of the solid composition. In an exemplary embodiment, the solids can have a weight of at least about 50 grams, at least about 100 grams, at least about 250 grams, at least about 1 kilogram, or at least about 10 kilograms.

In some embodiments, the solid composition may be dissolved, for example, in an aqueous or other medium, to create a concentrated and/or use solution. The solution may be directed to a storage reservoir for later use and/or dilution, or may be applied directly to a point of use in the laundering application. The solid compositions are beneficially designed as multi-use solids, such as blocks, and can be repeatedly used as a solid fabric softening composition for multiple cycles.

Methods of Making the Solid Compositions

The solid compositions described herein are solidified as cast solids. The solid compositions can be manufactured in commonly available mixing equipment. In some embodiments, in the formation of a solid composition, a mixing system may be used to provide for continuous mixing of the ingredients at high enough shear to form a substantially homogeneous solid or semi-solid mixture in which the ingredients are distributed throughout its mass. The mixture is processed at a temperature to maintain the physical and chemical stability of the ingredients. An ingredient may be in the form of a liquid or a solid such as a dry particulate, and may be added to the mixture separately or as part of a premix with another ingredient. One or more premixes may be added to the mixture. The ingredients are mixed to form a substantially homogeneous consistency wherein the ingredients are distributed substantially evenly throughout the mass. The mixture can be discharged from the mixing system through a die or other shaping means. The profiled extrudate then can be divided into useful sizes with a controlled mass.

The composition hardens due to the chemical or physical reaction of the requisite ingredients forming the solid. The solidification process may last from a few minutes to about six hours, or more, depending, for example, on the size of the cast or extruded composition, the ingredients of the composition, the temperature of the composition, and other like factors. In some embodiments, the cast composition "sets up" or begins to hardens to a solid form within about 1 minute to about 3 hours, or in the range of about 1 minute to about 2 hours, or in some embodiments, within about 1 minute to about 20 minutes.

Methods of Use

Generally for the fabric softening process, the solid softener is dispensed by contacting a solid with a sufficient amount of water to dissolve at least a portion of the solid fabric softener composition, thereby forming a dissolved portion of the solid fabric softener composition that can then be added to the rinse cycle of the laundry process. The water temperature for dispensing should be from about 40° C. to about 60° C., preferably from about 45° C. to about 55° C. The formulations of the present invention preferably dispense at greater than 10 grams/minute, more preferably greater than 15 grams/minute, and most preferably greater than 20 grams/minute without experiencing any weeping, sloughing or chunking in the dispensing of the multi-use solid blocks. The dispensing of the solid compositions described herein beneficially provide a non-weeping solid composition wherein the mass loss of the solid composition is less than about 10 grams per 100 grams (10%) at a temperature of up to 120° F. for 72 hours.

The diluted liquid compositions formed from the solid compositions disclosed herein are preferably used in the rinse cycle of the conventional automatic laundry operations. Generally, rinse water has a temperature from about 5° C. to about 60° C.

Fabrics or fibers are contacted with an amount of the solid softener composition that is effective to achieve the desired level of softness. The amount used is based upon the judgment of the user, depending on concentration of the softening material, fiber or fabric type, degree of softness desired, and the like. The amount of softener dispensed is typically characterized as the ratio of the amount of softening quaternary ammonium compound active to the amount of linen. This ratio is preferably in the range of from 0.01% quaternary ammonium compound active to linen to as high as 0.25%, more preferably in the range of 0.025% to 0.20%.

The amount of water used to deliver this amount of solid softening composition can be any amount that can conveniently dissolve the desired dose in the required amount of time to deliver the softening composition to the rinse cycle of the machine. For example, using water from 45° C. to 55° C. a 100 g dose of softening composition is typically dispensed in from 1 to 4 minutes using from 2 to 10 liters of water.

The solid fabric softening compositions beneficially provide softness without causing any significant loss of water absorption or wicking to the treated linen. As one of the primary functions of certain linens, such as towels is to absorb water, it is undesirable for fabric softener actives to make the surface hydrophobic and decrease the amount of water that can be absorbed. The solid fabric softening compositions do not reduce water absorption—which can be measured by the distance water can wick up a treated linen in a fixed period of time (as outlined in the Examples).

Beneficially, the treated linens have premium softness in addition to whiteness, brightness and malodor removal. By softness, it is meant that the quality perceived by users through their tactile sense to be soft. Such tactile perceivable softness may be characterized by, but not limited to resilience, flexibility, fluffiness, slipperiness, and smoothness and subjective descriptions such as "feeling like silk or flannel." In an embodiment, the softness resulting from the use of the solid fabric softening composition is at least equivalent to the softness preference exhibited by commercially available liquid fabric softener compositions.

The solid fabric softening compositions beneficially provide softness without causing any significant yellowing or discoloration to the treated linen. The yellowing gives the linens an unclean or unsavory appearance at best. As such, the use of quaternary ammonium fabric conditioners which cause yellowing may provide a nice feel, but shorten the overall life of a linen because the linen must be discarded before its otherwise useful life is exhausted. In the case of colored linens, yellowing is less obvious but the quaternary ammonium compounds cause a dulling of the colors over time. It is easily appreciated that it is desirable according to the compositions and methods disclosed herein to provide a fabric softening agent that does not cause significant yellowing or dulling of fabrics that are repeatedly washed and dried. Moreover, it is generally desirable for white laundry that is dried to remain white even after multiple drying cycles. That is, it is desirable that the fabric not yellow or dull after repeated cycles of drying. Yellowing or discoloration can be measured either directly visually or using a spectrophotometer, typically through "L," "a," and "b" values of the color scale. The color change is then reported as delta E (as outlined in the Examples) between treated and new linen. Typically a value of delta E>1 is considered perceptible to the human eye and indicates discoloration, such as yellowing.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following chemical components were used in the listed examples:

Quaternary Ammonium Compounds:

- High iodine value quat (HQ1)—triethanolamine ester quaternary ammonium compound having an iodine value of 17 ((HQ) triethanolamine (TEA) ester-quaternary ammonium compound);
- Low iodine value quat (LQ1)—DHTDMAC (dihydrogenated tallow dimethyl ammonium chloride), having an iodine value of 0;
- Low iodine value quat (LQ2)—DEEDMAC (Diethyl ester dimethyl ammonium chloride), having an iodine value of 7;
- Sokalan DCS—mixture of dicarboxylic acids adipic, glutaric and succinic acid;
- Silicone—aminofunctional silicone fluid.

Example 1

A fabric softness study was conducted to compare the fabric softening capability of a biodegradable high iodine value (HQ) triethanolamine (TEA) ester-quaternary ammonium compound to a nonbiodegradable low iodine value (LQ1) DHTDMAC quaternary ammonium compound. The low iodine value style quaternary ammonium compounds are known to provide fabric softening and this study was conducted to compare the fabric softening capability. A total of 20 consecutive laundering cycles—involving both wash and dry cycles—were performed on two sets of linens comprising cotton terry towels. All treatment towels were scoured by running two consecutive wash cycles using a high amount (7 oz/cwt) of an alkaline detergent. A 35-pound washer was filled with 28 pounds of cotton terry towels. The remaining wash and dry cycles were then run consecutively according to two different treatment systems set forth in Table 2. After the cycles were completed, the towels were kept in a controlled environmental chamber overnight at a temperature of between 65° F. and 75° F., with a humidity of 40-50%.

The next day, the towels were assessed by a human panel of at least 20 different panelists. When presented to panelists, the towels were folded identically and the order of the samples (e.g. AB or BA) was randomized across panels. To compare and assess the towels, the panelists had to touch/handle both towels in each set and choose which towel possessed superior qualities (in this case, softness). The panelists had to choose one towel from each pair; if the panelist maintained no difference between the towels, the data indicated the pairs were equal.

TABLE 2

| | Treatment 1 | Treatment 2 |
|---|---|---|
| Detergent System | Neutral Detergent (3 oz/cwt)/ Caustic Builder (7 oz/cwt) | Neutral Detergent (3 oz/cwt)/ Caustic Builder (7 oz/cwt) |
| Bleach | Chlorine Bleach (5 oz/cwt) | Chlorine Bleach (5 oz/cwt) |
| Fabric Softener | 28% active Ester-Quat (7 oz/cwt) | 11% active DHTDMAC (7 oz/cwt) |

The panelists chose the sample perceived to have superior softness. 90% of the participants chose Treatment 2 as the softer of the two treatments. The methods and procedures regarding laundering and evaluation by a consumer panel were repeated except that the fabric softener used in Treatment 2 had 8.8% active DHTDMAC. In this instance, the pairwise panel noted equivalent softness performance between Treatments 1 and 2. These results indicate that at higher active levels (11% compared to the 8.8%) the non-biodegradable low iodine value quaternary ammonium compounds provide superior treatment as compared to high iodine value quaternary ammonium compounds.

Example 2

As the use of a DHTDMAC quaternary ammonium compound can result in linens becoming dim/dingy and losing water absorption/wicking capabilities, the impact of DHTDMAC quaternary ammonium compounds on the appearance of linens was assessed. To limit the negative impact of DHTDMAC quaternary ammonium compounds an amino-functional silicone was evaluated in combination to combat the undesirable effects of DHTDMAC quaternary ammonium compounds. However, the addition of liquid silicone to a solid fabric softener makes the formulations soft and leads to sloughing during dispensing. This undesirable effect on a solid is a limitation that must be overcome to develop a solid fabric softener composition that not only prevents dinginess and a reduction in wicking capabilities, but also sloughing and softness.

20 consecutive laundering cycles—involving both wash and dry cycles—were performed on two sets of linens comprising cotton terry towels. The sets of linen were subjected to three treatment systems according to Table 3. The color change of the linen was measured using both a spectrophotometer and by making visual observations. Using the spectrophotometer, the towels were assessed by placing different sections of the towel in front of the reflectance port of the spectrophotometer. This process is repeated for a total of 10 different locations per towel, excluding edges or decorative bands. The total color change is measured according to the following formula:

$\Delta E$=total color difference $$\Delta E=\sqrt{((L_{final}-L_{initial})^2+(a_{final}-a_{initial})^2+(b_{final}-b_{initial})^2)}$$

In this formula, L is the light to dark number in the color spectrum, wherein 0=totally black, 100=totally white. "a" is the red to green number in the color solid, wherein a positive number is toward red and a negative number is toward green. Finally, b is the yellow to blue number in the color solid, wherein a positive number is toward yellow and a negative number is toward blue. A value of $\Delta E>1$ is considered perceptible to the human eye. The results of the color analysis are provided in Table 3.

In addition to color difference, wicking/absorption was also measured. To assess wicking, three test swatches sized 4"×7" were cut out of the test towels. The test swatches are marked with a line located 10 mm from the bottom. A colored dye solution is placed into a wicking apparatus, which comprises a basin filled partially with a blue dye solution. The test swatches were suspended from the top of the wicking apparatus using paper binder clamps, and then the swatches were lowered into the colored dye solution up to the marked 10 mm line. The test swatches were left undisturbed for six minutes. After six minutes, the test swatches were removed from the dye solution, and the highest point reached by the dye solution is marked with a dot. The distance between the 10 mm line to the dot is measured. The procedure was repeated at least three times and averaged for the final data point. A larger water wicking distance on terry towels indicated a higher water absorption capacity of the towels. A result of at least 20 mm or greater is a preferred result for water absorption. The results of the wicking test are provided in Table 3.

TABLE 3

| | Neutral Detergent/ Caustic Builder | DHTDMAC % | Aminofunctional Silicone % | DHTDMAC: Silicone Ratio | ΔE | Wicking |
|---|---|---|---|---|---|---|
| Treatment 1 | 3 oz/cwt/ 7 oz/cwt | 12 | 4 | 3:1 | 1.91 | 17 mm |
| Treatment 2 | 3 oz/cwt/ 7 oz/cwt | 9.6 | 4 | 2.4:1 | 0.6 | 35 mm |
| Treatment 3 | 3 oz/cwt/ 7 oz/cwt | 7.2 | 4 | 1.8:1 | 0.39 | 50 mm |

The DHTDMAC/silicone ratio which maintains ideal linen color and moisture absorption was identified between approximately 3:1 to 1.8:1. At the high end of the ratio, a change in linen color is noted after the twentieth laundering cycle. At a DHTDMAC/silicone ratio of 2.4 and below, the linen color change was much lower; no perceptible difference was noted with respect to the color of the garments. Water absorption was adequate for towels treated with a fabric softener composition with a DHTDMAC/silicone ratio of 2.4 or below.

Example 3

Further solid softener weeping and sloughing analyses were conducted. 100-gram samples were prepared according to the formulations in Table 4. These formulations evaluated three different quaternary ammonium compound actives with different iodine values: a quaternary ammonium compound with a high iodine value (≥15) (HQ), and quaternary ammonium compounds with a low iodine value (≤15) (LQ1 and LQ2). Each quaternary ammonium compound was assessed at different concentrations: 33% for the high iodine value quaternary ammonium compounds, 11% for the low iodine value quaternary ammonium compounds. These concentrations were chosen based on the equivalent softening performance assessed in Example 1.

After the samples were prepared, they were chilled overnight below 0° C. The samples were allowed to come up to room temperature and were weighed to assess a starting weight. Then, in sets of eight, the specimen cup samples were placed on metal stands in a 120° F. water bath for two days. The samples were removed, weighed, and evaluated using visual observations, a Penetrometer and the Likert scale every twelve hours over the course of two days.

TABLE 4

| Raw Material | Form. 1 (wt. %) | Form. 2 (wt.%) | Form. 3 (wt. %) | Form. 4 (wt.%) | Form. 5 (wt. %) |
|---|---|---|---|---|---|
| HQ | 0 | 11 | 0 | 33 | 0 |
| LQ2 | 0 | 0 | 0 | 0 | 11 |
| LQ1 | 11 | 0 | 33 | 0 | 0 |
| PEG 200 | 5 | 5 | 5 | 5 | 5 |
| PEG 8000 | 5 | 5 | 5 | 5 | 5 |
| Sokalan DCS | 35 | 35 | 13 | 13 | 35 |
| Silicone | 4 | 4 | 4 | 4 | 4 |
| Sodium Chloride | 40 | 40 | 40 | 40 | 40 |

To assess hardness using a Penetrometer, a given sample was placed on a penetrometer and penetrated for five seconds. The depth of penetration was measured in millimeters. The measuring process was then repeated for a total of three penetrations over different areas of the sample to arrive at an average. Generally the penetrometer readings range from 0 mm to the height of the sample (about 32 mm). Penetrometer hardness is an indicator of sloughing because samples that become soft under high-humidity conditions are prone to falling apart either from gravity or the water pressure of a dispenser.

To assess hardness based on visual observations and the subjective softness ratings on a Likert scale, the structural integrity of each sample was valuated based on its smoothness and cohesion, as well as relative softness according to Table 5. Hardness was considered satisfactory based on a relative hardness comparison to other compositions.

TABLE 5

| Likert Scale Index | |
|---|---|
| Rating | Description |
| 1 | Softest sample possible; very pliable, can squeeze to around half diameter; limiting softness is specimen container not sample |
| 2 | Slightly harder than softest samples; can squeeze over 2 cm |
| 3 | Some resistance from sample; roughly correlated with the penetrometer not reaching the bottom of the specimen cup |
| 4 | Sample is deformable over 1 cm but feels quite hard; has significant resistance to squeezing |
| 5 | Sample is deformable up to 0.5 cm, but is very hard |
| 6 | Sample is very hard; is just barely squeezable/deformable |
| 7 | Hard sample; not at all deformable |

The results of this weeping study are shown in Table 6. Table 6 depicts the concentration of the quaternary ammonium compound, the initial mass and hardness, as well as the final mass, weeping, and hardness.

TABLE 6

| | Form. 1 | Form. 2 | Form. 3 | Form. 4 | Form. 5 |
|---|---|---|---|---|---|
| Softening actives | LQ1 + silicone | HQ + silicone | LQ1 + silicone | HQ + silicone | LQ2 + silicone |
| Concentration of Quat | 11% | 11% | 33% | 33% | 11% |
| Initial mass (g) | 108.37 | 107.74 | 109.75 | 109.36 | 108.85 |
| Initial hardness (100 g sample) (mm) | 0.1 | 2.1 | 3.0 | 32 | 1.0 |
| Post-weeping mass (g) | 102.59 | 95.02 | 16.18 | 21.21 | 92.24 |
| Mass loss (g) | 5.78 | 12.72 | 93.57 | 88.15 | 16.61 |
| Hardness on Likert scale | 2 | 1 | n/a | n/a | 2 |

Before the evaluation, Formulation 1 was harder than either Formulation 2 or Formulation 5. After the weeping test, Formulation 2 was softer than both Formulation 1 and Formulation 5, suggesting that for samples containing the same amount of quaternary ammonium compounds, those with high iodine value quaternary ammonium compounds were softer than those made with low iodine value quaternary ammonium compounds. The same trend was noted between Formulation 3 and Formulation 4 before weeping. Overall the data demonstrate that at both high and low levels of quaternary ammonium compounds, formulations made with low iodine value, i.e. an iodine value of 15 or below are harder and typically lose less mass under weeping conditions than those made with high iodine values.

Example 4

Formulations containing low iodine value quaternary ammonium compounds both comprising and lacking silicone were evaluated. Samples were made with a quaternary ammonium compound having an iodine number of <15. One of test formulations further contained silicone, as shown in Table 7. The samples were assessed using the methods described in Example 3, including the Likert scale according to Table 5.

TABLE 7

| | Form. 6 | Form. 7 |
|---|---|---|
| Softening Actives | Quat with iodine number <15 + silicone | Quat with iodine number <15 |
| Concentration of Quat | 11% | 11% |
| Initial Mass (g) | 108.85 | 108.52 |
| Initial Hardness with 100 g (mm) | 1.0 | 0.9 |
| Post-weeping Mass (g) | 92.24 | 100.18 |
| Weeping Mass Loss (g) | 16.61 | 8.34 |

As demonstrated in Table 7, both formulations demonstrate acceptable hardness. Both formulations also demonstrate minimal mass loss from weeping. As a result, the formulations made with LQ2, both with and without silicone, maintain strength and cohesion under weeping conditions.

Example 5

Mixtures of quaternary ammonium compounds possessing varying iodine numbers were assessed. LQ2 (high iodine value, i.e. an iodine value of greater than 15) and LQ1 (low iodine value, i.e. an iodine value equal to or less than 15) were mixed in 10:90, 50:50, and 30:70 ratios with HQ to assess the effect on weeping performance, hardness, and cohesiveness of the sample. The ratios were chosen using the ratios of Example 1 as a baseline. Mixture samples were prepared according to the formulations in Table 8.

TABLE 8

| Raw Material | 10:90 HQ:LQ1 Form. 9 (wt. %) | 50:50 HQ:LQ1 Form. 10 (wt. %) | 30:70 HQ:LQ1 Form. 11 (wt. %) | 10:90 HQ:LQ2 Form. 12 (wt. %) | 50:50 HQ:LQ2 Form. 13 (wt. %) | 30:70 HQ:LQ2 Form. 14 (wt. %) | LQ1 (Nominal) Form. 15 (wt. %) |
|---|---|---|---|---|---|---|---|
| HQ | 3 | 18 | 9.9 | 3 | 16.5 | 9.9 | 0 |
| LQ2 | 0 | 0 | 0 | 15 | 8.25 | 11.55 | 0 |
| LQ1 | 10 | 5 | 7.7 | 0 | 0 | 0 | 11 |
| PEG 200 | 5 | 5 | 5 | 5 | 5 | 5 | 5 |
| PEG 8000 | 5 | 5 | 5 | 5 | 5 | 5 | 5 |
| Sokalan DCS | 33 | 23 | 28.4 | 28 | 21.25 | 24.55 | 35 |
| Silicone | 4 | 4 | 4 | 4 | 4 | 4 | 4 |
| Sodium Chloride | 40 | 40 | 40 | 40 | 40 | 40 | 40 |

After preparation, the samples were assessed for hardness and weeping using the methods described in Example 3, including the Likert scale according to Table 5. The results of this analysis are shown in Table 9 below.

TABLE 9

| | Form. 9 | Form. 10 | Form. 11 | Form. 12 | Form. 13 | Form. 14 | Form. 15 |
|---|---|---|---|---|---|---|---|
| Quat Mixture | 10:90 HQ:LQ1 | 50:50 HQ:LQ1 | 30:70 HQ:LQ1 | 10:90 HQ:LQ2 | 50:50 HQ:LQ2 | 30:70 HQ:LQ2 | LQ1 (Nominal) |
| Initial Mass (g) | 108.4 | 108.63 | 108 | 108.76 | 109.84 | 110.4 | 108.8 |
| Initial Hardness with 100 g (mm) | 5.9 | 30 | 24 | 9 | 22 | 11 | 7 |
| Post-weeping Mass (g) | 102.47 | 92 | 101.55 | 99.35 | 93.59 | 100.8 | 104.36 |
| Weeping Mass Loss (g) | 2.93 | 16.63 | 6.45 | 9.41 | 16.25 | 9.6 | 4.44 |
| Hardness on Likert Scale | 2 | 1 | 1 | 1 | 1 | 1 | 2 |

Regarding overall appearance, for both the low-iodine quaternary ammonium compound, the 10:90 sample appeared the smoothest and most cohesive. Table 9 further demonstrates that the low iodine number quaternary ammonium compound content is directly correlated with hardness. The 10:90 formulations were consistently harder before weeping, although the 30:70 and 10:90 formulations had comparable hardness post-weeping. Samples with LQ1 were slightly harder than samples with LQ2, although all formulations comprising LQ1 and LQ2 exhibited minimal mass loss and ideal cohesion. All 10:90 formulations were comparable—both in terms of post-weeping hardness and mass loss—to the nominal levels of LQ1 (e.g. Formulation 15). Formulation 9 and Formulation 15 demonstrated the best cohesion/hardness and least amount of mass loss. Formulations 11 and 14 (which are comparable) and Formulation 13 also showed good performance in terms of cohesion/hardness and mass loss. Formulation 10 had acceptable performance.

These results show that increasing low iodine value quaternary ammonium compounds produces a more stable and harder formulation. Similarly, these results show that low iodine value quaternary ammonium compounds can be mixed with high iodine value quaternary ammonium compounds in mass ratios based on softening provided ranging from 10:90 to 50:50 while still maintaining acceptable sample cohesion, mass loss, and hardness.

Example 6

The impact of both processing aids for the solidification matrix and silicone on the formulations of the present application were evaluated. Varying quantities of polyethylene glycol 200 and polyethylene glycol 8000 (PEG 200, PEG 8000) were assessed in test formulations according to Table 10, based on weight percent of the raw materials. As Table 10 shows, the amount of PEG 200 and PEG 8000 was varied from about 1 wt. % to about 15 wt. %. Further, Table 12 shows the effect of adding a significant amount of silicone in a solid softener formula on sloughing performance.

TABLE 10

| Raw Material | Form. 16 | Form. 17 | Form. 18 | Form. 19 | Form. 20 | Form. 21 | Form. 22 | Form. 23a | Form. 23b | Form. 23c | K Form. 23d |
|---|---|---|---|---|---|---|---|---|---|---|---|
| LQ1 | 11 | 11 | 11 | 11 | 11 | 11 | 11 | 10 | 10 | 10 | 10 |
| PEG 200 | 1 | 5 | 5 | 15 | 5 | 0 | 0 | 4.5 | 4.5 | 4.5 | 4.5 |
| PEG 8000 | 1 | 5 | 15 | 5 | 1 | 0 | 0 | 4.5 | 4.5 | 4.5 | 4.5 |
| Stearic Acid | 0 | 0 | 0 | 0 | 2 | 0 | 4 | 0 | 1 | 0 | 1 |
| Sokalan DCS | 43 | 35 | 25 | 25 | 37 | 40 | 35 | 34 | 33 | 34 | 33 |
| Silicone | 4 | 4 | 4 | 4 | 4 | 4 | 4 | 4 | 4 | 4 | 4 |
| Sodium Acetate | 0 | 0 | 0 | 0 | 0 | 10 | 10 | 0 | 0 | 0 | 0 |
| Citric Acid | 0 | 0 | 0 | 0 | 0 | 5 | 5 | 0 | 0 | 0 | 0 |
| Sodium Chloride | 40 | 40 | 40 | 40 | 40 | 30 | 30 | 33 | 33 | 33 | 28 |
| Sodium Citrate | 0 | 0 | 0 | 0 | 0 | 0 | 0 | 10 | 10 | 0 | 0 |
| Monosodium citrate | 0 | 0 | 0 | 0 | 0 | 0 | 0 | 0 | 0 | 10 | 10 |

After preparation, the samples were assessed for hardness and weeping using the methods described in Example 3, including the Likert scale according to Table 5. The results of this analysis are shown in Table 11 below.

TABLE 11

| | Form. 17 | Form. 18 | Form. 19 | Form. 20 |
|---|---|---|---|---|
| PEG 200 mass (g) | 5 | 5 | 15 | 5 |
| PEG 8000 mass (g) | 5 | 15 | 5 | 1 |
| Stearic Acid mass (g) | 0 | 0 | 0 | 2 |
| Initial mass (g) | 108.23 | 107.27 | 108.37 | 108.28 |
| Initial Hardness with 100 g (mm) | 0.9 | 2.5 | 20.3 | 1.2 |
| Post Weeping Mass (g) | 102.45 | 79.6 | 17.31 | 106.87 |
| Weeping Mass Loss (g) | 5.78 | 27.67 | 91.06 | 1.41 |
| Hardness Score on Likert Scale | 2 | 2 | n/a | 5 |

For Formulations 21 and 22, the absence of either PEG 200 or PEG 8000 resulted in a cracked, dry surface. At moderate levels of PEG 200 (e.g. ≤15 wt. %) as demonstrated by Formulation 17, the formulations lost a minimal amount of mass during weeping. This demonstrates the effectiveness of PEG 200 as a processing aid. In comparison, the high levels of PEG 200 in Formulation 19 resulted in a loss of cohesion and mass, indicating that although PEG 200 is an effective processing aid, the range of PEG 200 should be limited. In comparison, formulation hardness increased proportionate to the levels of PEG 8000. Both Formulation 17 and Formulation 18, comprising PEG 8000, demonstrated acceptable hardness and mass loss under weeping conditions; however, Formulation 17 lost less mass and had an overall better appearance in terms of cohesion and uniformity.

As the absence of PEG resulted in cracks and loss of cohesion, stearic acid was added to assess its impact on stability. Formulation 21 (containing no PEG) was compared with Formulation 22, a similar formulation further comprising stearic acid. These formulations were further compared with Formulation 20, containing low levels of PEG and stearic acid. The results indicate that stearic acid can be used as a replacement for PEG and can promote cohesion while maintaining high sample hardness and good weeping performance.

Moreover, processing aids can prevent sloughing and mass loss. These include but are not limited to fatty acids like stearic acid and palmitic acid, fatty acid derivatives like stearic monoethanolamide and octadecanedioic acid. Formulation 20 had the highest hardness and least mass loss of all samples in Table 11. Formulation 23c and 23d were made with monosodium citrate with and without stearic acid, respectively. Adding 1% stearic acid increased cohesion and reduced water penetration into the sample. The same trend was observed with the Formulation 23a and 23b; compared to Formulation 23a, Formulation 23b maintained a harder and more uniform surface under dispensing conditions, and was more resistant to water penetration into the sample.

In addition to evaluating varying levels PEG and substitution with stearic acid, the effects of silicone were assessed in solid softener formulas according to Table 12.

TABLE 12

| Raw Material | Form. 1 (wt. %) | Form. 2 (wt. %) | Form. 3 (wt.%) |
|---|---|---|---|
| LQ1 | 11 | 11 | 11 |
| PEG 200 | 5 | 5 | 5 |
| PEG 8000 | 5 | 5 | 5 |
| Sokalan DCS | 39 | 35 | 13 |
| Silicone | 0 | 4 | 4 |
| Citric Acid | 0 | 0 | 15 |
| Sodium Chloride | 40 | 40 | 25 |
| Observations | Remained hard throughout use | Significant sloughing during use | Remained hard throughout use |

For Formulation 1, which did not contain silicone, the formula remain hard throughout use and no significant sloughing was observed. However, when silicone was added to the formula, as shown by Formulation 2, at an amount needed to decrease dinginess and wicking, the formula sloughs significantly during use in the dispenser. As a result, to prevent sloughing with formulas containing silicone, it is important to add another material capable of absorbing moisture and staying hard throughout dispensing. To address this issue, Formulation 3 further comprised anhydrous citric acid. Anhydrous citric acid is a non-deliquescent material that remains crystalline in a high humidity chamber. Formulation 3, containing the non-deliquescent material, beneficially remained hard throughout use, preventing sloughing during dispensing and preventing both mass loss and weeping. Thus, Table 12 demonstrates that where a solid fabric softener composition contains silicone, additional materials capable of absorbing moisture and improving hardness should be added. Further non-deliquescent materials were evaluated in Example 1.

Example 7

Given the impact of silicone on hardness and weeping as demonstrated by Examples 2, 4, and 6, additional non-deliquescent materials were evaluated for their ability to aid in absorbing moisture and facilitating stability. Examples of tested non-deliquescent materials include sodium acetate, magnesium sulfate, sodium sulfate, lactose monohydrate, potassium chloride, and citric acid/sodium citrate. Tables 10-12 demonstrate that anhydrous citric acid or its salts can be utilized as an additional solidification and anti-weeping aid, especially where silicone is present in the composition. As a result, further analyses were conducted using citric acid and its salts, as well as other non-deliquescent materials. 100-gram formulations were prepared according to Table 13. Specifically, varying ratios of citric acid and sodium citrate were tested, ranging from 0-15% citric acid and 0-15% sodium citrate.

TABLE 13

| Raw Materials | Form. A (wt.%) | Form. B (wt. %) | Form. C (wt. %) | Form. D (wt. %) | Form. E (wt. %) |
|---|---|---|---|---|---|
| LQ1 | 11 | 11 | 10 | 10 | 10 |
| PEG 200 | 5 | 5 | 4.5 | 4.5 | 4.5 |
| PEG 8000 | 5 | 5 | 4.5 | 4.5 | 4.5 |
| Sokalan DCS | 35 | 35 | 33 | 33 | 33 |
| Silicone | 4 | 4 | 4 | 4 | 4 |
| Sodium Citrate | 0 | 15 | 5 | 10 | 15 |
| Citric Acid | 15 | 0 | 0 | 0 | 0 |
| Sodium Chloride | 25 | 25 | 38 | 33 | 27 |

After preparation, Formulations A-B were assessed for hardness and weeping using the methods described in Example 3, including the Likert scale according to Table 5. Table 14 shows the evaluation of these formulations.

TABLE 14

| | Form. A | Form. B |
|---|---|---|
| Non-deliquescent material | 15% citric | 15% citrate |
| Initial mass (g) | 108.67 | 109.43 |
| Initial hardness with 100 g (mm) | 1.5 | 16 |
| Post weeping mass (g) | 79.34 | 90.13 |
| Weeping mass loss (g) | NA | 14.3 |
| Hardness on Likert Scale | NA | 1 |

Formulation B exhibited minimal mass loss under weeping conditions. Formulation C was easily removable from the specimen container but remained a cohesive block. Formulations A-B had minimal to no sloughing. Formulations C-E were evaluated for sloughing during dispensing. Sample D exhibited the least chunking and sloughing during dispensing.

In view of the success demonstrated by the addition of citric acid and citrate, further non-deliquescent materials were evaluated for their ability to provide hardness and reduce weeping. 100-gram formulations comprising a variety of anhydrous organic salts, anhydrous inorganic salts, organic and inorganic hydrates, inorganic salts with an endothermic hydration, and anhydrous organic acids/salts were prepared according to Table 15.

TABLE 15

| Raw Material | Form. 23 (wt. %) | Form. 24 (wt. %) | Form. 25 (wt. %) | Form. 26 (wt. %) | Form. 27 (wt. %) | Form. 28 (wt. %) | Form. 29 (wt. %) | Form. 30 (wt. %) |
|---|---|---|---|---|---|---|---|---|
| LQ1 | 11 | 11 | 11 | 11 | 11 | 11 | 10 | 10 |
| PEG 200 | 5 | 5 | 5 | 5 | 5 | 5 | 4.5 | 4.5 |
| PEG 8000 | 5 | 5 | 5 | 5 | 5 | 5 | 4.5 | 4.5 |
| Sokalan DCS | 35 | 35 | 35 | 35 | 35 | 35 | 34 | 33 |

TABLE 15-continued

| Raw Material | Form. 23 (wt. %) | Form. 24 (wt. %) | Form. 25 (wt. %) | Form. 26 (wt. %) | Form. 27 (wt. %) | Form. 28 (wt. %) | Form. 29 (wt. %) | Form. 30 (wt. %) |
|---|---|---|---|---|---|---|---|---|
| Stearic Acid | 0 | 0 | 0 | 0 | 0 | 0 | 0 | 1 |
| Silicone | 4 | 4 | 4 | 4 | 4 | 4 | 4 | 4 |
| Sodium Acetate | 0 | 0 | 0 | 0 | 0 | 10 | 5 | 0 |
| Sodium Sulfate | 0 | 10 | 0 | 0 | 0 | 0 | 0 | 0 |
| Magnesium Sulfate | 10 | 0 | 0 | 0 | 0 | 0 | 0 | 0 |
| Lactose Monohydrate | 0 | 0 | 10 | 0 | 0 | 0 | 0 | 0 |
| Potassium Chloride | 0 | 0 | 0 | 10 | 0 | 0 | 0 | 0 |
| Citric Acid | 0 | 0 | 0 | 0 | 10 | 0 | 0 | 0 |
| Sodium Citrate Dihydrate | 0 | 0 | 0 | 0 | 0 | 0 | 0 | 10 |
| Monosodium Citrate | 0 | 0 | 0 | 0 | 0 | 0 | 10 | 0 |
| Sodium Chloride | 30 | 30 | 30 | 30 | 30 | 30 | 28 | 33 |

After preparation, the Samples 23-28 were assessed for hardness and weeping using the methods described in Example 3, including the Likert scale according to Table 5. The results of this analysis are depicted in Table 16.

TABLE 16

| | Form. 23 | Form. 24 | Form. 25 | Form. 26 | Form. 27 | Form. 28 |
|---|---|---|---|---|---|---|
| Non-Deliquescent Material | Magnesium Sulfate | Sodium Sulfate | Lactose Monohydrate | Potassium Chloride | Citric Acid | Sodium Acetate |
| Anhydrous | Yes | Yes | No | Yes | Yes | Yes |
| Initial mass (g) | 106.13 | 108.13 | 107.25 | 108.92 | 106.49 | 108.04 |
| Initial Hardness with 100 g (mm) | 0.4 | 1.0 | 1.2 | 0.6 | 0.4 | 32 |
| Post Weeping Mass (g) | 98.98 | 101.84 | 94.53 | 99.17 | 95.84 | 65.4 |
| Weeping Mass Loss (g) | 7.15 | 6.29 | 12.72 | 9.75 | 10.65 | 42.64 |
| Hardness Score on Likert Scale | 5 | 2 | 3 | 1 | 2 | 1 |

With the exception of Formulation 28, all of the formulations in Table 16 had a high initial hardness and comparable hardness through the evaluation process. Although Formulations 23-27 performed comparably, Formulation 23 and 25 resulted in a harder final sample. All of the formulations except for Formulation 28 lost only about 10% or less of their original mass.

The overall appearance of the formulations were evaluated. All formulations appeared cohesive except Formulations 24 and 27, which exhibited some minor surface pitting. Further, as Formulation 28 was significantly softer (both initially and after evaluation) and lost more mass relative to the other formulations. Formula 29, which also contained the acetate, however, exhibited adequate hardness and cohesiveness. These results indicate that a variety of non-deliquescent materials can be used effectively to prevent loss of mass and promote hardness, especially where silicone is present in the composition.

Example 8

Various surfactants were evaluated in the solid compositions to promote dissolution of hydrophobic materials (e.g. quat) in an effort to reduce buildup of these materials in the dispensing unit. Formulations were made with and without surfactant, and were tested for sloughing. To achieve differentiation, samples were dispensed for 15 cycles at 145 F. To test the solubility of the material remaining on the grate, the softener dispense cycle was then run twice with an empty capsule to rinse away any easily soluble material. Photos were taken before starting dispensing, after the 15 cycles, and after the 2 empty cycles. The evaluated formulations are shown in Table 17.

TABLE 17

| Raw Materials | Form. 29 (surfactant) | Form. 31 |
|---|---|---|
| LQ1 | 10 | 10 |
| PEG 200 | 4.5 | 4.5 |
| PEG 8000 | 4.5 | 4.5 |
| Stearic Acid | 2 | 1 |
| Sokalan DCS | 31 | 32 |
| Silicone | 4 | 4 |
| Sodium Citrate Dihydrate | 10 | 10 |
| Salt (NaCl) | 33 | 31 |
| EO-PO based surfactant | 1 | 0 |

The evaluations demonstrated that adding surfactant significantly improved the solubility of hydrophobic components in the formulation, reducing buildup of sloughed material on the grate. Form. 29 showed a marked reduction in sloughing buildup relative to Form. 31. The evaluation shows that addition of a surfactant may be desirable for enhanced dispensing of the solid compositions.

Example 9

Additional formulations employing surfactants were evaluated. Use of surfactants in the solid formulations to aid processing, dispensing, and reduce sloughing were evaluated. Nonionic surfactants with HLB 10-15 were evaluated to add into the formulation to promote dissolution of hydrophobic materials (e.g. quaternary ammonium compounds) and reduce buildup of these materials on the grate in a dispenser for the solid composition.

Formulations as shown in Table 18 were made with and without surfactant, including nonionics (Surfactant 1 and 2) and cationic (Surfactant 3), and were tested for sloughing. To achieve differentiation, samples were dispensed for 15 cycles at 145° F. To test the solubility of the material remaining on the grate of the dispenser, the softener dispense cycle was then run twice with an empty capsule to rinse any easily soluble material off the grate. Visual observations and photographs were taken before starting dispensing, after 15 cycles, and after the 2 empty rinse cycles (dispensing with an empty capsule, to check how easy it was to clear the grate) to assess solubility of hydrophobic components in the formulation and the impact on reducing buildup of sloughed material on the dispensing grate.

TABLE 18

| Raw Materials | Form 31 | Form 32 | Form 33 | Form 34 |
|---|---|---|---|---|
| NQL (DHTDMAC, LQ1) | 10 | 10 | 10 | 10 |
| PEG 200 | 4.5 | 4.5 | 4.5 | 4.5 |
| PEG 8000 | 4.5 | 4.5 | 4.5 | 4.5 |
| Stearic Acid | 2 | 1 | 1 | 1 |
| Sokalan DCS | 31 | 32 | 32 | 32 |
| Silicone | 4 | 4 | 4 | 4 |
| Sodium Citrate Dihydrate | 10 | 10 | 10 | 10 |
| Salt (NaCl) | 33 | 31 | 31 | 31 |
| Surfactant 1 with HLB 10-15 (Tomadol 25-7) | 1 | 0 | 0 | 0 |
| Surfactant 2 with HLB <10 (Tomadol 24-3) | 0 | 1 | 0 | 0 |
| Surfactant 3 - cationic surfactant (Bardac 205M quat) | 0 | 0 | 0 | 1 |

Formulation 31 (surfactant HLB 10-15) demonstrated improvement in the solubility of hydrophobic components in the formulation, reduced buildup of sloughed material on the dispensing grate, as a result of reduction in sloughing buildup relative to Formulation 33 (no surfactant), Formulation 32 (surfactant HLB <10), and Formulation 34 (cationic surfactant).

Beneficially, the surfactant improved solubility of the quaternary ammonium compound and other hydrophobic species without decreasing softness performance of the composition and allowed higher loading of hydrophobic components. As a still further benefit, the surfactant prevents fouling of dispenser components.

Example 10

Additional formulations employing variations in processing aids were evaluated, namely PEG 200. The formulations in Table 19 were evaluated according to the methods of Example 9.

TABLE 19

| Raw Materials | Form 35 | Form 36 | Form 37 |
|---|---|---|---|
| NQL (DHTDMAC, LQ1) | 10 | 10 | 10 |
| PEG 200 | 4 | 0 | 2.5 |
| MPEG 550 | 0 | 4 | 0 |
| PEG 8000 | 4.5 | 4.5 | 4.5 |
| SMEA | 1 | 1 | 1 |
| Sokalan DCS | 32.5 | 32.5 | 32.5 |
| Silicone | 4 | 4 | 4 |
| Sodium Citrate Dihydrate | 10 | 10 | 10 |
| Salt (NaCl) | 33 | 31 | 31 |
| Surfactant 1 with HLB 10-15 (Tomadol 25-7) | | | 2 |

Formulation 35 exhibited good dispensing behavior, with little to no sloughing.

Formulation 36 having 4% MPEG 550 (methoxy poly (ethylene glycol) substituted for PEG 200. Formulation 36 was softer than 4.5% PEG 200, and exhibited good dispensing behavior, with little to no sloughing demonstrating that MPEG 550 is a good processing aid, but PEG 200 is preferred for composition hardness.

Formulation 37: having 2% PEG 200 in combination with 2% nonionic alcohol ethoxylate surfactant having an HLB between 10-15 showed comparable hardness to Formulation 35, and exhibited little to no sloughing demonstrating that the surfactant is an acceptable processing aid for the solid compositions.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A multi-use solid laundry fabric softening composition comprising:

from about 5 wt-% to about 15 wt-% of an ester quaternary ammonium compound with an iodine value less than or equal to 15;

an organosilicone comprising a polyalkyl silicone, an aminosilicone, a siloxane, a polydimethyl siloxane, an ethoxylated organosilicone, a propoxylated organosilicone, an ethoxylated/propoxylated organosilicone, or mixtures thereof, wherein the ratio of the ester quaternary ammonium compound to the organosilicone is from less than 3:1 to about 1.8:1; and a processing aid for solidification comprising a combination of polyethylene glycol and an acidulent;

wherein the solid laundry fabric softening composition is a non-weeping solid at a temperature of up to 120° F. for 72 hours as measured by less than about 10 gram loss per 100 grams.

2. The composition of claim 1, wherein the processing aid for solidification further comprises a surfactant.

3. The composition of claim 2, wherein the processing aid for solidification further comprises (a) a water soluble salt that is not hygroscopic and may comprise one or more of sodium citrate, sodium monocitrate, magnesium sulfate, and/or (b) a stabilizer comprising a long chain fatty acid or a derivative of a long chain fatty acid.

4. The composition of claim 3, wherein the long chain fatty acid or a derivative of a long chain fatty acid is stearic acid, palmitic acid, behenic acid, coco fatty acid, stearic monoethanolamide, coco-monoethanolamide, stearic monoethanolamide or combinations thereof.

5. The composition of claim 1, wherein the ester quaternary ammonium comprises a di-alkenyl ester of triethanol ammonium methyl sulphate and N,N-di(tallowoyloxy ethyl) N,N-dimethyl ammonium chloride, a di-oleic ester of triethanol ammonium methyl with triethanolamine dimethyl sulphate quaternized, a partially hardened or hardened tallow ester of triethanol ammonium ethyl sulphate with triethanolamine dimethyl sulphate quaternized, a palm ester of triethanol ammonium methyl sulphate with triethanolamine dimethyl sulphate quaternized, an unsaturated carboxylic acid reaction product with triethanolamine dimethyl sulphate quaternized, a triethanolamine ester quat, a methyldiethanolamine ester quat, a diamidoquat, a dialkyldimethyl quat, or a combination thereof.

6. The composition of claim 5, wherein the ester quaternary ammonium comprises a methyl bis(ethyl tallowate)-2-hydroxyethyl ammonium methyl sulfate, a methyl bis(hydrogenated tallow amidoethyl)-2-hydroxyethyl ammonium methyl sulfate, a dihydrogenated tallow dimethyl ammonium chloride, or a combination thereof.

7. The composition of claim 1, wherein a ratio of the quaternary ammonium compound to the silicone is from less than 3:1 to about 1.8:1.

8. The composition of claim 1, wherein the polyethylene glycol solidification agent is one or more of a PEG 200, PEG 400, PEG 600, PEG 800, PEG 1,000, PEG 2,000, PEG 3,000, PEG 4,000, PEG 5,000, PEG 6,000, PEG 7,000, PEG 8,000, PEG 9,000, PEG 10,000 and derivatives and methoxy poly(ethylene glycol), and wherein the water soluble salt is a salt of a polycarboxylic acid.

9. The composition of claim 1, wherein the silicone comprises between about 0.5 wt-% and about 20 wt-% of the solid composition and processing aid comprises between about 0 wt-% and about 25 wt-% of the solid composition.

10. The composition of claim 3, wherein the water soluble salt comprises between about 5 wt-% and about 50 wt-% of the solid composition, and the acidulant comprises between about 1 wt-% and about 50 wt-% of the solid composition.

11. The composition of claim 1, further comprising a corrosion inhibitor, stabilizing agent and/or additional surfactant, and wherein each of the processing aid for solidification and/or additional surfactant comprise a nonionic, anionic and/or cationic surfactant.

12. The composition of claim 1, wherein the solid composition is a multi-use composition that is at least 250 grams, and/or wherein the solid is a cast or extruded solid, and wherein the solid is a capsule, tablet, puck, brick or block.

13. A multi-use solid laundry fabric softening composition comprising:

from about 5 wt-% to about 15 wt-% of an ester quaternary ammonium compound with an iodine value less than or equal to 15;

an organosilicone comprising a polyalkyl silicone, an aminosilicone, a siloxane, a polydimethyl siloxane, an ethoxylated organosilicone, a propoxylated organosilicone, an ethoxylated/propoxylated organosilicone, or mixtures thereof, wherein the ratio of the ester quaternary ammonium compound to the organosilicone is from less than 3:1 to about 1.8:1; and a processing aid for solidification comprising a nonionic alcohol ethoxylate surfactant having an HLB between about 10-15 and/or a cationic surfactant, a stabilizer comprising a long chain fatty acid or a derivative of a long chain fatty acid, and one or more of polyethylene glycol, an acidulant, and a non-hygroscopic water soluble salt, wherein the composition is a non-weeping solid at a temperature of up to 120° F. for 72 hours as measured by less than about 10 gram loss per 100 grams.

14. The composition of claim 13, wherein the non-hygroscopic water soluble salt comprises sodium citrate, sodium monocitrate, magnesium sulfate, or combinations thereof.

15. The composition of claim 13, wherein (a) the long chain fatty acid or a derivative of a long chain fatty acid is stearic acid, palmitic acid, behenic acid, coco fatty acid, stearic monoethanolamide, coco-monoethanolamide, stearic monoethanolamide or combinations thereof, (b) wherein the polyethylene glycol solidification agent is one or more of a PEG 200, PEG 400, PEG 600, PEG 800, PEG 1,000, PEG 2,000, PEG 3,000, PEG 4,000, PEG 5,000, PEG 6,000, PEG 7,000, PEG 8,000, PEG 9,000, PEG 10,000, and methoxy poly(ethylene glycol), (c) wherein the acidulant is citric acid, and/or (d) wherein the water soluble salt is a salt of a tricarboxylic acid.

16. The composition of claim 13, wherein the quaternary ammonium compound comprises a di-alkenyl ester of triethanol ammonium methyl sulphate and N,N-di(tallowoyloxy ethyl) N,N-dimethyl ammonium chloride, a di-oleic ester of triethanol ammonium methyl with triethanolamine dimethyl sulphate quaternized, a partially hardened or hardened tallow ester of triethanol ammonium ethyl sulphate with triethanolamine dimethyl sulphate quaternized, a palm ester of triethanol ammonium methyl sulphate with triethanolamine dimethyl sulphate quaternized, an unsaturated carboxylic acid reaction product with triethanolamine dimethyl sulphate quaternized, a triethanolamine ester quat, a methyldiethanolamine ester quat, a diamidoquat, a dialkyldimethyl quat, and combinations thereof, and wherein a ratio of the quaternary ammonium compound to the silicone is from less than 3:1 to about 1.8:1.

17. The composition of claim 13, further comprising a corrosion inhibitor, stabilizing agent and/or additional surfactant, and wherein the solid composition is a multi-use composition that is at least 250 grams, and/or wherein the solid is a cast or extruded solid in the form of a capsule, tablet, puck, brick or block.

18. A method for treating fabric in a wash wheel, the method comprising:

obtaining the solid laundry fabric softening composition according to claim 1, and contacting the solid laundry fabric softening composition with water to form an aqueous suspension; and dispensing the aqueous suspension to a wash wheel, where it contacts the fabric to be treated.

19. The method of claim 18, wherein the dispensing of the aqueous suspension is at least about 10 grams/minute with water at a temperature between about 40° C. and 60° C. and the treated fabric does not exhibit yellowing or fabric color change as measured by value of delta E>1.

* * * * *